(12) United States Patent
Westergaard

(10) Patent No.: US 9,546,573 B2
(45) Date of Patent: Jan. 17, 2017

(54) METHOD AND EQUIPMENT FOR TURNING A BLADE OR A BLADE PART FOR A WIND TURBINE DURING PRODUCTION OR INSTALLATION

(71) Applicant: Envision Energy (Denmark) ApS, Silkeborg (DK)

(72) Inventor: Jan Westergaard, Brande (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 837 days.

(21) Appl. No.: 13/894,492

(22) Filed: May 15, 2013

(65) Prior Publication Data

US 2013/0315740 A1 Nov. 28, 2013

(30) Foreign Application Priority Data

May 15, 2012 (DK) .................................. 2012 70252

(51) Int. Cl.
 *F03D 1/00* (2006.01)
 *F01D 25/28* (2006.01)
 *F03D 1/06* (2006.01)

(52) U.S. Cl.
 CPC ............... *F01D 25/28* (2013.01); *F03D 1/001* (2013.01); *F03D 1/0675* (2013.01); *Y02E 10/721* (2013.01); *Y02E 10/728* (2013.01); *Y02P 70/523* (2015.11); *Y10T 29/49316* (2015.01)

(58) Field of Classification Search
 CPC .......... F01D 25/28; F03D 1/001; F03D 1/003; F03D 1/0675

USPC ......................................................... 248/200
See application file for complete search history.

(56) References Cited

U.S. PATENT DOCUMENTS

| 4,433,830 | A | * | 2/1984 | Campbell | ............. | F01D 25/285 254/264 |
|---|---|---|---|---|---|---|
| 8,186,960 | B2 | | 5/2012 | Dawson et al. | | |
| 2010/0158661 | A1 | | 6/2010 | Dawson et al. | | |
| 2010/0254813 | A1 | * | 10/2010 | Dawson | ................ | B66C 23/207 416/146 R |
| 2010/0301379 | A1 | | 12/2010 | Yokoyama et al. | | |

(Continued)

FOREIGN PATENT DOCUMENTS

| CN | 1688808 A | 10/2005 |
|---|---|---|
| CN | 101970331 A | 2/2011 |

(Continued)

*Primary Examiner* — Eric Keasel
*Assistant Examiner* — Danielle M Christensen
(74) *Attorney, Agent, or Firm* — James Creighton Wray

(57) ABSTRACT

A method for installing an inner blade part or a wind turbine blade and to a lifting bracket for use in performing said method, e.g., a inner blade part for a partial pitch wind turbine blade comprising an inner blade part and an outer blade part, said inner blade part comprising a first flange for connection to a hub flange at a wind turbine hub and a second flange for connection to an outer blade part, said flanges all comprising a number of bolts and/or bolt holes. The lifting bracket has a flange for connection to a suitable number of bolts and/or bolt holes at said second flange on the inner blade part, the flange having a first surface and an opposite second surface arranged for interfacing with the first flange, and further the lifting bracket also has at least one lifting lug and at least one counter weight.

9 Claims, 5 Drawing Sheets

(56) References Cited

U.S. PATENT DOCUMENTS

2012/0107084 A1* 5/2012 Krogh .................... B66C 1/108
                                                                    414/800
2012/0134825 A1* 5/2012 Grabau ................ F03D 7/0228
                                                                    416/144

FOREIGN PATENT DOCUMENTS

| CN | 102422016 A | 4/2012 |
|----|-------------|--------|
| DE | 20 2010 003 033 U1 | 7/2010 |
| EP | 2 226 496 A2 | 9/2010 |
| JP | H 11-182408 A | 7/1999 |
| WO | 2010/147480 A1 | 12/2010 |

* cited by examiner

METHOD AND EQUIPMENT FOR TURNING A BLADE OR A BLADE PART FOR A WIND TURBINE DURING PRODUCTION OR INSTALLATION

BACKGROUND OF THE INVENTION

1. Field of the Invention

The present invention relates to a method for installing an inner blade part of a wind turbine blade, said method comprising the steps of hoisting said inner blade part and arranging said inner blade part in relation to said hub flange.

2. Description of Related Art

The invention further relates to a lifting bracket suitable to be used during installation of an inner blade part of a wind turbine blade, e.g., a inner blade part for a partial pitch wind turbine blade comprising an inner blade part and an outer blade part, said inner blade part comprising a first flange for connection to a hub flange at a wind turbine hub and a second flange for connection to an outer blade part, said flanges all comprising a number of bolts and/or bolt holes.

Finally, the invention relates to the use of a lifting bracket and a method as mentioned above.

It is well known that blades for modern wind turbines have to be handled during production, transport and installation and as such blades easily can have a length of 40 to 60 meters or in the near future up to approximately 80 meters, handling can be quite a challenge.

Most of the wind turbines produced are so-called pitch controlled or active stall controlled. The blade is installed at some kind of bearing at the hub and via said bearing it is possible to rotate the blade about a central axis of the flange at the hub. When a wind turbine blade has to be installed at the hub, the blade will be hoisted and positioned at said hub and typically the bearing will be rotated and/or adjusted into the right position in relation to bolt holes in a flange at the root end of the blade. Typically, the right position is the nearest bolt hole as the blade can be positioned in its final position after installation by activating the pitch system. In this way many blades have been installed over the years and the method works very well.

Due to the fact that the blades are becoming longer and longer, to be able to produce more power, several attempts to produce dividable blades for a wind turbine have been made. Until now, nobody has come up with a solution that really works. As the blades during use are facing quite drastic deformations there is a large challenge in designing the interface on the respective parts of a dividable blade.

One way of dealing with the problems incurred by manufacturing and handling long blades is to design a wind turbine having blades with partial pitch. Such blades are typically stall controlled on the innermost part, also called the inner blade part, and pitch controlled at the outermost part, also called the outer blade part. There is thus provided a pitch bearing at the joint between the inner and the outer blade part. Such a blade will typically be divided between ⅓ and ½ of the length when measured from the root end of the blade and towards the tip end. The inner blade part is designed as a rigid component that is suitable for having a pitch bearing installed at the interface towards the outer blade part.

When installing the outer blade part to the inner blade part the same method as discussed above can be used with no problems. When it comes to installing the inner blade part to the hub, which typically will take place before installing the outer blade part, a number of other problems arise. As there is no pitch bearing between the hub and the inner blade part to rotate the blade into any position, the blade can not be installed in just any position, it has to be aligned according to and installed into the exact bolt holes. Such a handling will often take place at the erection site of the wind turbine. Even though the blade is divided into an inner blade part and an outer blade part, the two parts are still big, heavy and are not easy to handle. The diameter at the root end will typically be 2.5 to 3.5 meters or even more and the inner blade part can e.g., have a weight of approximately 10 to 20 metric ton or more and a length of e.g., 20 to 40 meters or even more. It is thus clear that this is a job for a crane or even for two cranes. But still the inner blade part has to be positioned at the exact bolt holes.

SUMMARY OF THE INVENTION

It is an object of the invention to provide a solution for installation of a blade or a blade part comprising a first flange, at a second flange at a hub of a wind turbine, where said hub or blade, at the interface does not comprise a pitch bearing or other equipment allowing one or both of said flanges to be rotated about its center axis.

It is a further object of the invention to provide a solution for handling a blade or a blade part e.g., a blade or blade part produced as a typical wind turbine blade with an airfoil shaped cross section, without having to attach lifting equipment such as chains and slings to parts of the blade or blade parts having a somewhat fragile airfoil shaped cross section.

It is also an object of the invention to provide mechanical equipment for performing such handling as described above.

As mentioned above, the invention relates to a method for installing an inner blade part of a wind turbine blade, e.g., an inner blade part for a partial pitch wind turbine blade comprising an inner blade part and an outer blade part, said inner blade part comprising a first flange at a first end for connection to a hub flange at a wind turbine hub and a second flange at a second end for connection to an outer blade part, said flanges all comprising a number of bolts and/or bolt holes, said method comprising the steps of hoisting said inner blade part and arranging said inner blade part in relation to said hub flange, also comprising a number of bolts and/or bolt holes, at said hub as also mentioned in the introductory part of the text.

The method further comprises at least the following steps:
installing a lifting bracket at a pitch bearing at the second end of said inner blade part, where said second flange is the free flange on said pitch bearing;
connecting lifting equipment e.g., a sling to said lifting bracket;
supporting the first end of the inner blade part near the first flange;
hoisting the inner blade part in the first and second end e.g., in a substantially horizontal direction,
rotating the inner blade part about a central and longitudinal axis, by working rotating means at one of the first end or the second end of the inner blade part, while the second end is rotated at said pitch bearing, until the inner blade part is in position and said bolts and/or bolt holes are aligned;
fixating said flanges to each other at a common interface.

When installing an inner blade part according to the method mentioned above several advantages are obtained. The lifting bracket that is installed at the pitch bearing gives the opportunity to rotate the blade part about its axis as the bracket is fixated to the free flange at said pitch bearing. The free flange is to be understood as the flange that is prepared for installation of the outer blade part, but still is not in use for that purpose. When supporting the first end of the inner blade part said inner blade part can be rotated about its central and longitudinal axis to align bolts and/or bolt holes in a very simple and relatively easy manner.

Rotation of the inner blade part can be done in various ways and in one further embodiment of a method according to the invention; this is done by a method that further comprises at least the following steps:

arranging a sling around the first end of the inner blade part near the first flange;

rotating the inner blade part about a central and longitudinal axis, by working the sling at the first end of the inner blade part, while the second end is rotated at said pitch bearing, until the inner blade part is in position and said bolts and/or bolt holes are aligned.

This is a very simple solution that can be carried out by using a crane connected to each of two ends of said sling, where one crane wire is pulled while another crane wire is slackened, which will rotate the blade part as the sling is placed with more than one turn around the first end of the inner blade part as also seen in FIG. 5 below. In this embodiment of the invention the inner blade part is supported at the first end by said sling.

Yet a further embodiment of a method according to the invention further comprises at least the following steps:

arranging a support at the first end of the inner blade part near the first flange;

arranging a pitch drive mechanism at the pitch bearing at the second end of the inner blade part;

rotating the inner blade part about a central and longitudinal axis, by operating said pitch drive mechanism at the second end of the inner blade part, while the first end is rotated in said support and the second end is rotated at said pitch bearing, until the inner blade part is in position and said bolts and/or bolt holes are aligned.

Turning said inner blade part can also be done by using a pitch drive mechanism e.g., the pitch gear and motor intended for operating and controlling the pitch angle of the outer blade part when the turbine is up and running. The pitch drive mechanism can also be a special tool that is used during installation of the inner blade part, and perhaps also during installation of the outer blade part. The main purpose with the pitch drive mechanism during installation is to enable a rotation of the inner blade part about its longitudinal axis by working the pitch bearing to rotate. As the pitch bearing already comprises a toothed rim for engagement with a pitch drive during operation of the blade it becomes handy to use either said toothed rim or even also the pitch drive intended for controlling and rotating the outer blade part in relation to the inner blade part during normal use of the wind turbine.

Support of the first end of the inner blade part can be taken care of in various ways, and above, using a sling e.g., a textile sling, has been mentioned. A support comprising a kind of table or support surface e.g., with a number of rubber wheels or rollers e.g., arranged in a concave manner can serve as a support. The main thing is that the inner blade part can be supported in a secure manner without damaging the surface of the inner blade part.

The term "sling" is to be interpreted as a general term including a crane wire, a chain, and a sling, e.g., a textile sling or the like. This method will also be described in the detailed description, and it will also be depicted in the figures.

The invention further comprises a lifting bracket suitable to be used during installation of an inner blade part of a wind turbine blade, e.g., a inner blade part for a partial pitch wind turbine blade comprising an inner blade part and an outer blade part, said inner blade part comprising a first flange for connection to a hub flange at a wind turbine hub and a second flange for connection to an outer blade part, said flanges all comprising a number of bolts and/or bolt holes.

A lifting bracket according to the invention comprises flange means for connection to a suitable number of bolts and/or bolt holes at said second flange on the inner blade part when said lifting bracket is installed at said second flange, said flange means comprises a first surface and a second opposite surface, where said first surface is arranged for interfacing the second flange at said inner blade part when said lifting bracket is installed at said second flange, and further said lifting bracket comprises at least one lifting lug and at least one counter weight.

When using said lifting bracket, the first surface is placed towards the second flange, and bolts or nuts are tightened against the second opposite surface of the lifting bracket. As a lifting bracket according to the invention needs to be capable of handling the weight of e.g., 10 metric tons the lifting bracket itself need to be manufactured from a material that can withstand the loads. A lifting bracket according to the invention will typically be manufactured from steel and will thus be quite heavy. It can easily weigh up to 500 kilograms and will typically be handled with a crane. In order to position and to connect the lifting bracket to the flange at the inner blade part it becomes very clear that the counter weight on the lifting bracket makes installation of the lifting bracket much more easy. Said counter weight is positioned in a manner that allows the lifting bracket to be balanced in a certain pre-determined angle to vertical. Said angle will typically be 0 degrees to vertical, but can be adjusted by adding or removing some of the counter weight. The main purpose of having said counter weight is to be able to balance the lifting bracket according to the flange at the inner blade part. In this way it becomes much more easy and safe to bolt the lifting bracket onto the flange on the inner blade part.

In a preferred embodiment of a lifting bracket according to the invention, the flange means can comprise two, three or more fingers projecting in a radial direction from a center part of said lifting bracket, said fingers each comprising one or more bolts and/or bolt holes arranged for connection to said second flange at said inner blade part. By having said fingers projecting in a radial direction it becomes possible to take into account other parts, such as a support stand which is installed to said second flange. A typical situation is a support structure being installed at the lower part of the second flange, in order to support the inner blade part during storage and/or transport. Such a support can then be dismounted after the installation bracket is mounted and after the inner blade part is clear of the ground. The radial extending fingers can, as mentioned, comprise one or more holes or bolts for engagement with the flange at the inner blade part. The exact number of such fastening means can be determined by calculation and might differ from one inner blade part to another. An example will be described in the detailed description with reference to a figure.

At a lifting bracket according to the invention, the lifting bracket can comprise means for supporting said at least one lifting lug, where the at least one lifting lug is arranged at a first distance to said second opposite surface of the lifting bracket. By offsetting the lifting lug in relation to the second opposite surface of the lifting bracket it becomes possible to use a lifting bracket even though the inner blade part has aerodynamic shell parts or the like extending from the flange means, leaving the flange means situated in a kind of countersunk position.

A lifting bracket according to the invention can comprise means for adjusting said first distance to the second opposite surface of the lifting bracket. The possibility of adjusting the distance allows the user to perform an individual adjustment that is perfect for an individual situation. If e.g., the inner blade part is stored on the ground at a place where the ground is somewhat inclined it is possible to adjust the angle of the lifting bracket in relation to vertical to fit the angle of the flange at the inner blade part. Further it is possible to use the same lifting bracket for several different types of inner blade parts, where the design of the aerodynamic shell part differs.

A lifting bracket according to the invention may comprise means for supporting said at least one counter weight, where said counter weight is arranged at a second distance to said second opposite surface of the lifting bracket as will be seen in the figures below.

In a preferred embodiment of a lifting bracket according to the invention, the lifting bracket comprises means for adjusting one or both of said second distance to said second opposite surface of the lifting bracket and/or the weight of said at least one counter weight. In this way a multiple adjustment becomes possible as the lifting lug and/or the counter weight can be adjusted individually.

A lifting bracket according to the invention can comprise at least one counter weight on said lifting bracket that is arranged demountable at either a bracket for the lifting lug or at a bracket on the second opposite surface on the lifting bracket. The counter weight can then be installed and taken off as needed and it is also possible to install the counterweight in parts as it can comprise a number of individual parts weighing e.g., 50 kilograms per unit.

In a preferred embodiment of a lifting bracket according to the invention said at least one counter weight has a weight and/or position of said counter weight that, when the lifting bracket is hoisted in the lifting lug, balances the flange means on said lifting bracket in a certain angle between 0 to 90 degrees to horizontal. This will be the most used position as it is most common that the inner blade parts are situated in a horizontal state, thus leaving the second flange in a more or less vertical position.

Further the invention comprises use of a lifting bracket or a method according to the above description, during installation of an inner blade part of a partial pitch wind turbine blade.

An embodiment of the invention will now be described, by way of example only, with reference to the accompanying drawings.

DETAILED DESCRIPTION OF THE INVENTION

In the following text, the figures will be described one by one and the different parts and positions seen in the figures will be numbered with the same numbers in the different figures. Not all parts and positions indicated in a specific figure will necessarily be discussed together with that figure.

Figure 1:
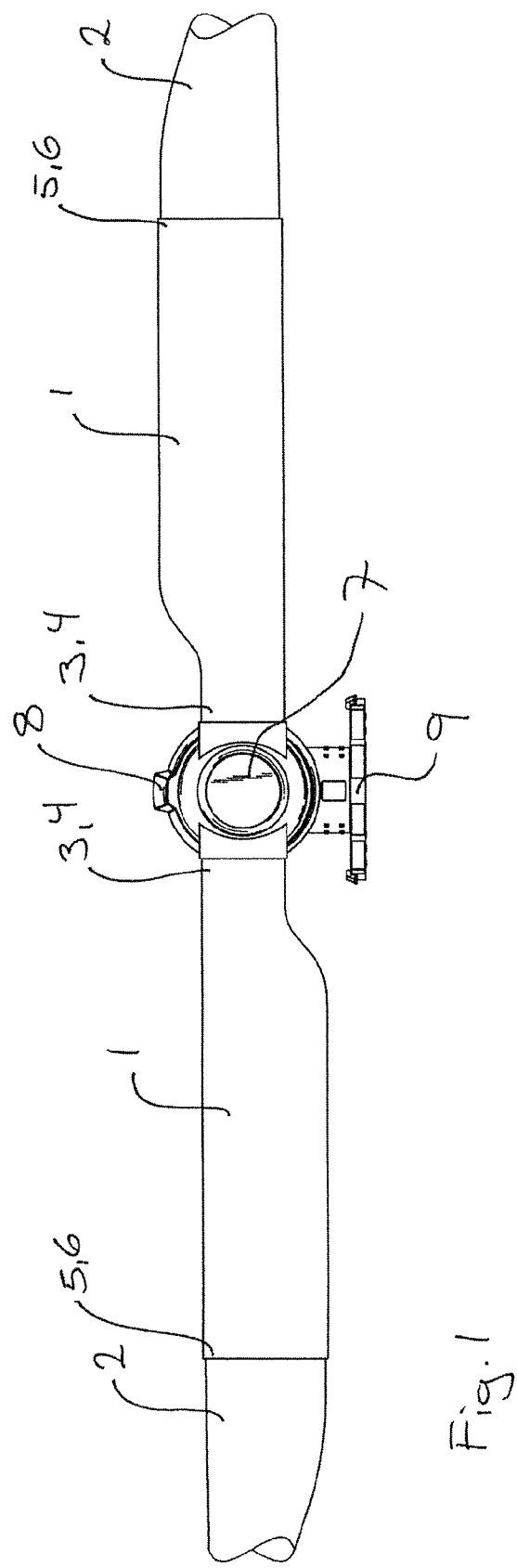
FIG. 1 shows a hub with two inner blade parts.

In FIG. 1, two inner blade parts 1 and parts of two outer blade parts 2 are seen. The inner blade parts 1 each comprise a first end 3 with a first flange 4 and a second end 5 with a second flange 6. The inner blade parts 2 are installed at a wind turbine hub 7 at a nacelle 8. The nacelle 8 is situated on the ground and is resting on a nacelle stand 9 during installation of the inner blade parts 1 and the outer blade parts 2, and until the complete nacelle 8 is ready for installation on a not shown tower for a typical wind turbine.

Figure 2:
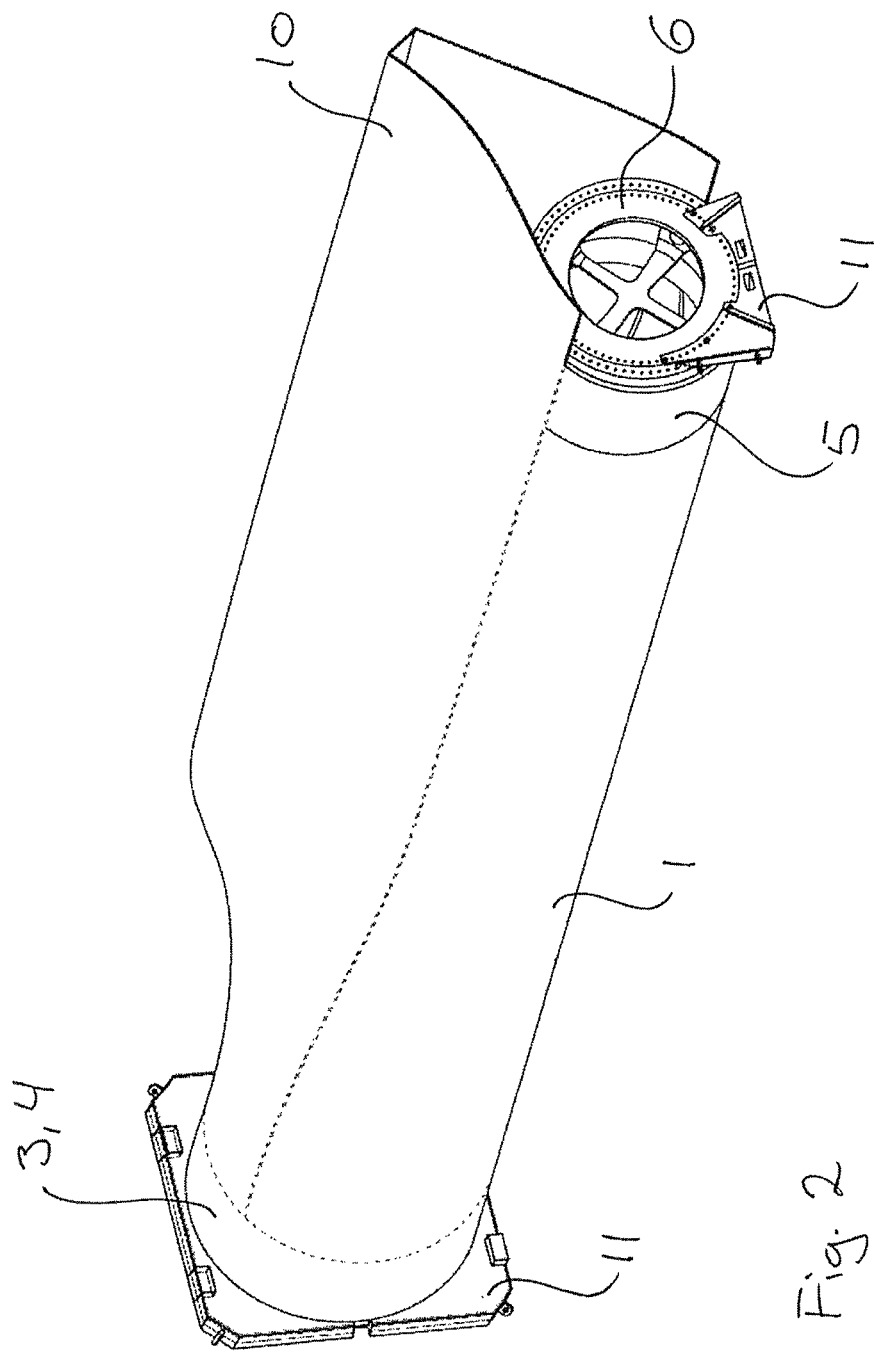
FIG. 2 shows an inner blade part mounted on transport/storage brackets.

In FIG. 2, an inner blade part 1 is seen mounted on transport/storage brackets also called a support structure 11. At the first end 3 of the inner blade part 1 a rather large support structure is mounted ant at the second end 5 the support structure 11 is only fixed to the lower part of the second flange 6 of the inner blade part 1. A blade part 1 can be stored and transported by using such support structures 11 and the inner blade part 1 itself is kept free from the ground.

The inner blade part 1 has an aerodynamic shell 10 that is seen projecting in the axial direction of the inner blade part 1 and extending from the second end 5 of the inner blade part 1, and thus leaving the second flange 6 of the inner blade part 1 in a kind of counter sunk position in relation to the aerodynamic shell 10.

Figure 3:
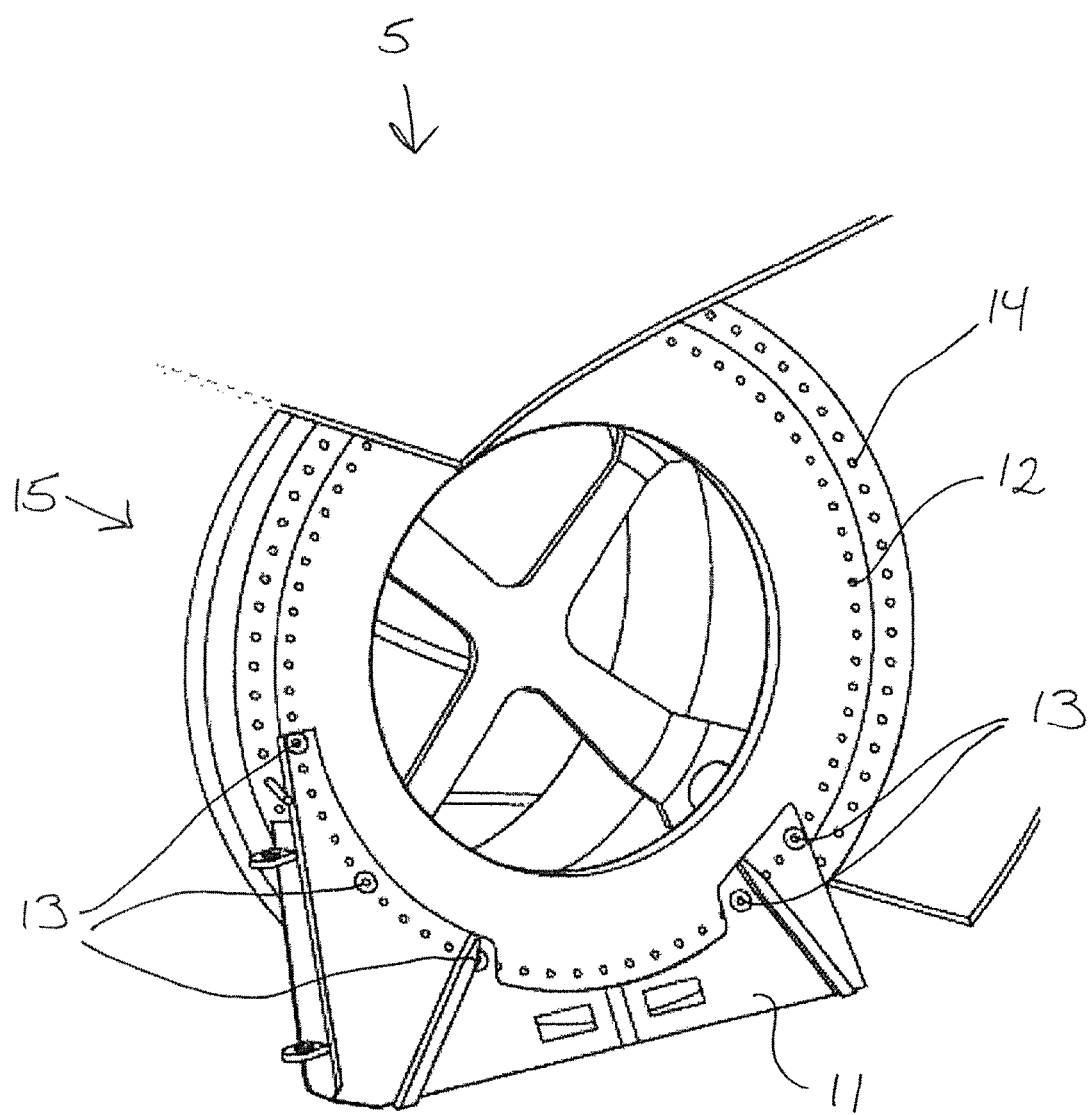
FIG. 3 show details of the second end of an inner blade part.

FIG. 3 show details of the second end 5 of an inner blade part 1, where the second flange 6 is seen comprising the inner bolt circle 12, where the support structure is fastened with a number of bolts 13. The outer blade part 2 as seen in FIG. 1 will be installed at the inner bolt circle 12 and the outer bolt circle 14 is used to fixate the entire pitch bearing arrangement 15 to which the inner blade part 1 is mounted. The pitch bearing 15 comprises the outer bolt circle 14 and the inner bolt circle 12 and the parts with the respective bolt circles 12, 14 are able to rotate in relation to each other about a common central axis.

Figure 4:
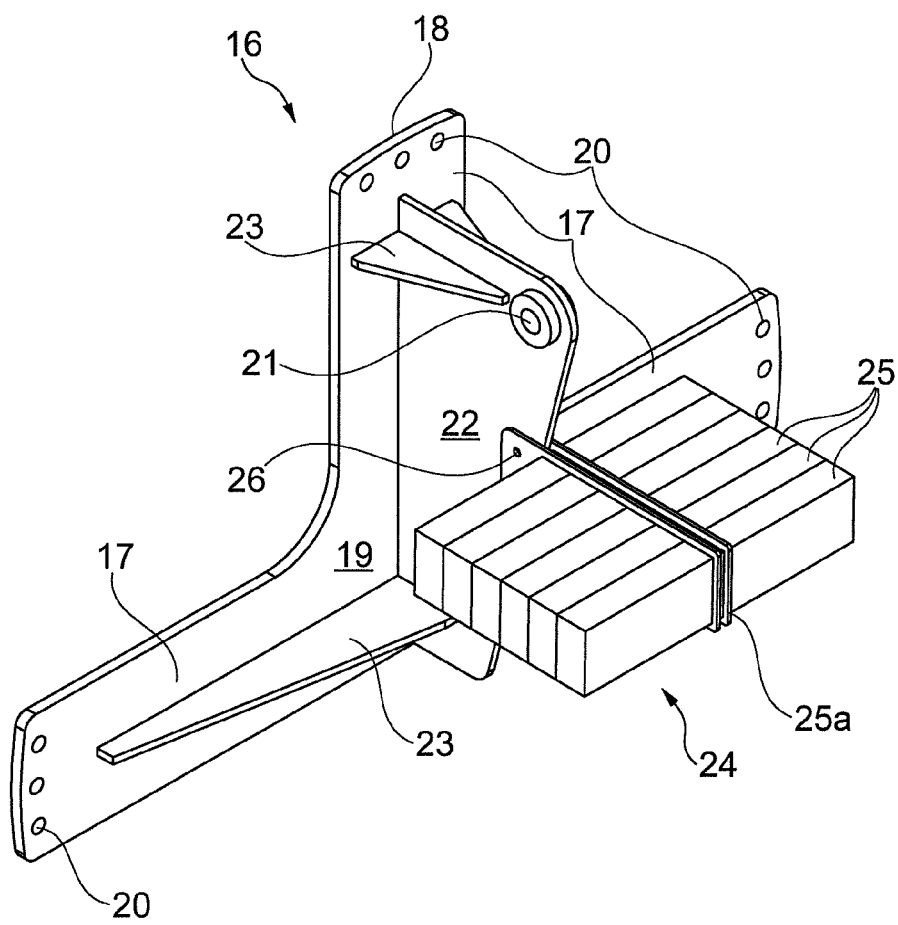
FIG. 4 shows a lifting bracket.

In FIG. 4, a lifting bracket 16 according to the invention is seen. The lifting bracket 16 comprises three projecting fingers 17 having a first surface 18 for engaging with the second flange 6 at the inner blade part 1. Said projecting fingers 17 is arranged in a manner that allow the lifting bracket 16 to be installed at the second flange 6 without interfering with the support structure 11 as seen in FIGS. 2 and 3.

Further, the lifting bracket comprises a second and opposite surface 19 of the flange means at the lifting bracket 16. Each of the projecting fingers 17 comprises three bolt holes 20 for fastening to said second flange 6 at the inner blade part. From the upright projecting finger 17 means for supporting a lifting lug 21 is extending. Said means also called a plate body 22 is further supported by ribs 23 arranged at the second and opposite surface 19 of the lifting bracket 16. The lifting lug 21 is arranged in the plate body 22 for engagement with not shown hoisting equipment. The plate body 22 also comprises a counter weight 24 that is constituted by six individual weight blocks 25. The counter weight 24 is arranged on a sub-bracket 25a which is bolted to the plate body 22 with a number of bolts 26. The number of individual weight blocks 25 can be chosen to the specific job as these weight blocks can be designed with individual fastening means for attachment to the sub-bracket 25a that allow the lifting bracket 16 to be used with less than six individual weight blocks 25. Further, also the position of the respective individual weight blocks 25 can be chosen to the specific job.

The plate body 22 could be designed with more than one lifting lug 21 or it could comprise a lifting lug with more than one aperture that would allow for adjustment of the position of the hoisting equipment in order to balance the complete lifting bracket 16 according to the angle of the second flange 6 of the inner blade part 1.

As mentioned in the description above, the counter weight 24 can also be designed to be moved into different positions to perform an adjustment of the angle of the projecting fingers 17 to vertical.

Figure 5:
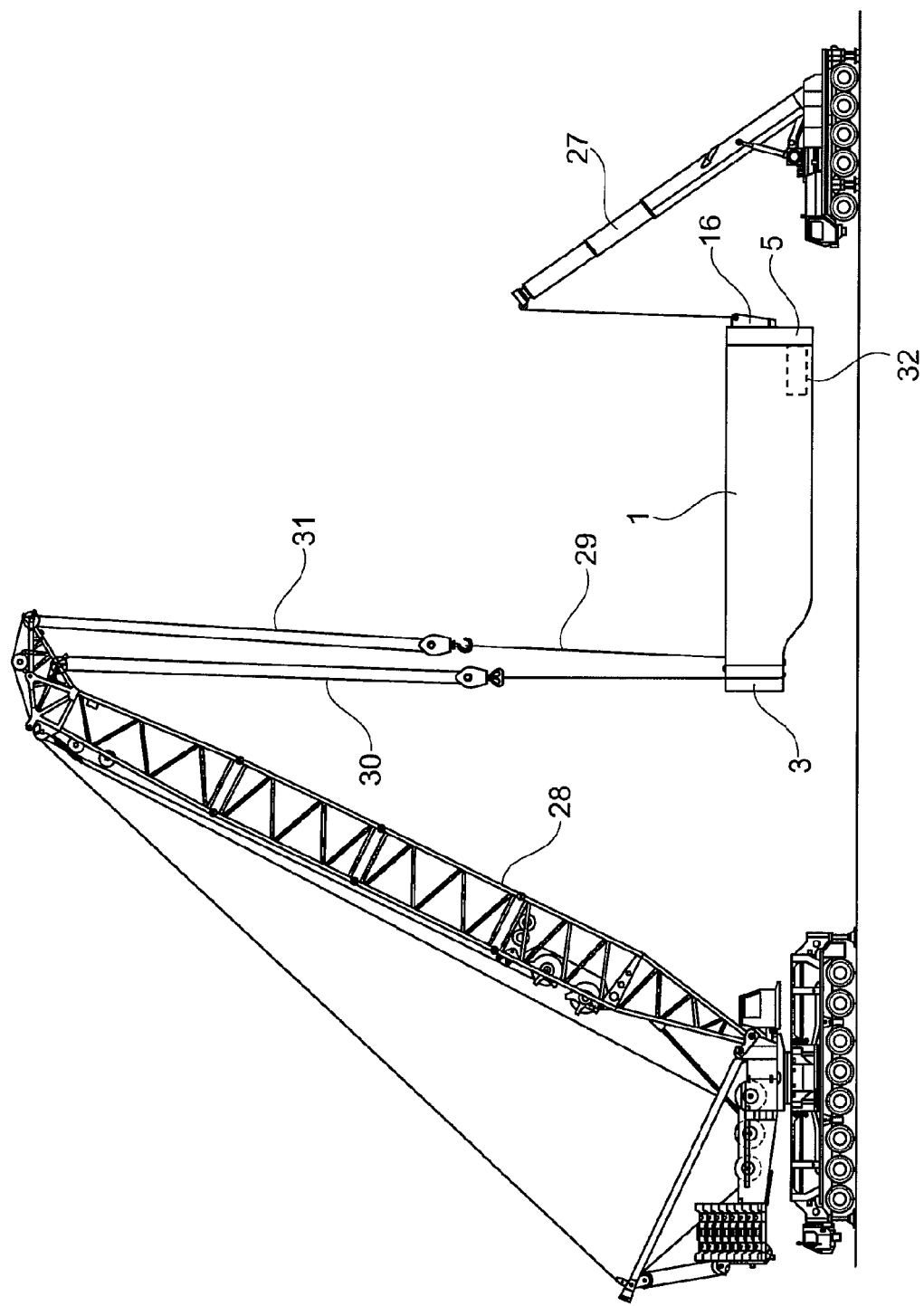
FIG. 5 shows two cranes handling an inner blade part using a lifting bracket.

Finally, FIG. 5 shows a small crane 27 and a large crane 28 handling an inner blade part 1 using a lifting bracket 16 at the end carried by the small crane 27. As the inner blade part 1 is clear from the ground and as a sling 29 is arranged around the first end 3 of the inner blade part 1, the complete inner blade part 1 can be rotated around its central axis by pulling a first crane wire 30, and at the same time slacking a second crane wire 31. A pitch drive mechanism 32 can be arranged at the pitch bearing 15 at the second end 5 of the inner blade part 1 and the inner blade part 2 can alternatively be rotated about the central longitudinal axis by operating said pitch drive mechanism 32. As the lifting bracket 16 is installed at the inner bolt circle 12 at the second flange 6 the inner blade part 1 is free to be rotated into the exact position where it fits the flange at the hub 7 as seen in FIG. 1. Due to the lifting bracket 16 it is now possible to handle the inner blade part without any risk of damaging the rather fragile aerodynamic shell 10.

The invention is not limited to the embodiments described herein, and may be modified or adapted without departing from the scope of the present invention as described in the patent claims below.

What is claimed is:

1. A method for installing an inner blade part of a wind turbine blade, for a partial pitch wind turbine blade, comprising, an inner blade part and an outer blade part, said inner blade part comprising a first flange at a first end for connection to a hub flange at a wind turbine hub and a second flange at a second end for connection to the outer blade part and being a free flange on a pitch bearing, said first and second flanges and said hub flange all comprising a number of at least one of bolts and bolt holes, said method comprising the steps of:
   hoisting said inner blade part and arranging said inner blade part in relation to said hub flange,
   wherein the method further comprises at least the following steps:
      installing a lifting bracket at the pitch bearing at the second end of said inner blade part, wherein said lifting bracket comprises:
   bracket flange means for connection to said number of at least one of bolts and bolt holes at said second flange on the inner blade part, said bracket flange means comprises a first surface and an opposite second surface, wherein said first surface is arranged for interfacing with the second flange at said inner blade part,
   at least one lifting lug and
   at least one counter weight;
      connecting lifting equipment to said lifting bracket;
      supporting the first end of the inner blade part near the first flange;
      hoisting the inner blade part at the first and second ends;
      rotating the inner blade part about a central longitudinal axis by working a rotating means at one of the first end and the second end of the inner blade part, while the second end is rotated at said pitch bearing, until the inner blade part is in position and said at least one of bolts and bolt holes at the first end are aligned with said at least one of bolts and bolt holes at the hub flange; and
   fixing said flanges to each other at a common interface.

2. The method according to claim 1, wherein said method further comprises at least the following steps:
   arranging a sling around the first end of the inner blade part near the first flange;
   rotating the inner blade part about the central longitudinal axis by working the sling at the first end of the inner blade part, while the second end is rotated at said pitch bearing, until the inner blade part is in position and said at least one of bolts and bolt holes at the first end are aligned with said at least one of bolts and bolt holes at the hub flange.

3. The method according to claim 1, wherein said method further comprises at least the following steps:
   arranging a support at the first end of the inner blade part near the first flange;
   arranging a pitch drive mechanism at the pitch bearing at the second end of the inner blade part;
   rotating the inner blade part about a central longitudinal axis by operating said pitch drive mechanism at the second end of the inner blade part, while the first end is rotated in said support and the second end is rotated at said pitch bearing, until the inner blade part is in position and said at least one of bolts and bolt holes at the first end are aligned with said at least one of bolts and bolt holes at the hub flange.

4. A lifting bracket suitable to be used during installation of an inner blade part of a partial pitch wind turbine blade comprising an inner blade part and an outer blade part, said inner blade part comprising a first flange for connection to a hub flange at a wind turbine hub and a second flange for connection to an outer blade part, said first and second flanges comprising a number of at least one of bolts and bolt holes, wherein said lifting bracket comprises:
   bracket flange means for connection to said number of at least one of bolts and bolt holes at said second flange on the inner blade part when said lifting bracket is installed at said second flange, said bracket flange means comprises a first surface and an opposite second surface, wherein said first surface is arranged for interfacing with the second flange at said inner blade part when said lifting bracket is installed at said flange,
   at least one lifting lug and
   at least one counter weight.

5. The lifting bracket according to claim 4, wherein said bracket flange means comprises a plurality of fingers projecting in a radial direction from a center part of said lifting bracket, said fingers each comprising at least one of at least one bolt and at least one bolt hole arranged for connection to said second flange at said inner blade part.

6. The lifting bracket according to claim 4, wherein said lifting bracket comprises means for supporting said at least one lifting lug, wherein said at least one lifting lug is arranged at a first distance from said opposite second surface of the lifting bracket.

7. The lifting bracket according to claim 4, wherein said lifting bracket comprises means for supporting said at least one counter weight, wherein said counter weight is arranged at a second distance from said opposite second surface of the lifting bracket.

8. The lifting bracket according to claim 4, wherein said at least one counter weight on said lifting bracket is arranged demountable at either of a bracket for the lifting lug and at a bracket on the opposite second surface on the lifting bracket.

9. The lifting bracket according to claim 4, wherein said at least one counter weight has at least one of a weight and a position that, when the lifting bracket is hoisted in the lifting lug, balances the flange means on said lifting bracket at a angle between 0 to 90 degrees relative to horizontal.

* * * * *